(No Model.)

J. WILLSEY.
Water Filter.

No. 231,464. Patented Aug. 24, 1880.

WITNESSES.
Arthur G. Morey.
Edward Sands

INVENTOR.
Jackson Willsey by
G. L. Chapin. Atty.

UNITED STATES PATENT OFFICE.

JACKSON WILLSEY, OF CHICAGO, ILLINOIS.

WATER-FILTER.

SPECIFICATION forming part of Letters Patent No. 231,464, dated August 24, 1880.

Application filed June 3, 1880. (No model.)

*To all whom it may concern:*

Be it known that I, JACKSON WILLSEY, of Chicago, in the county of Cook and State of Illinois, have invented a new and useful Improvement in Water-Filters, of which the following is a specification, reference being had to the accompanying drawings, illustrating the device, in which—

Figure 1:
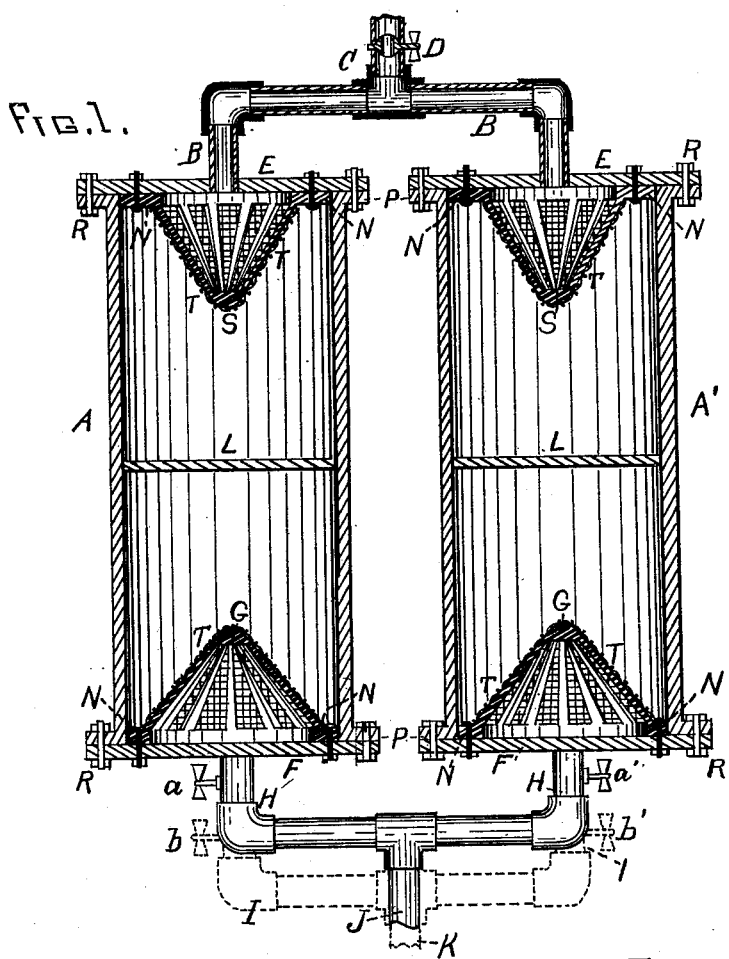
Figure 2:
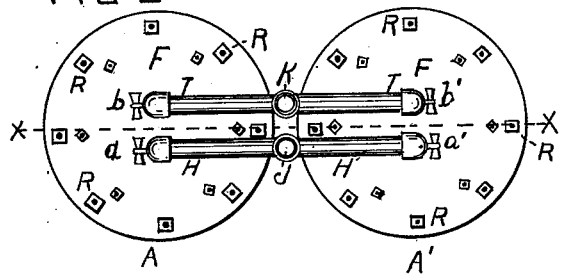
Figure 3:
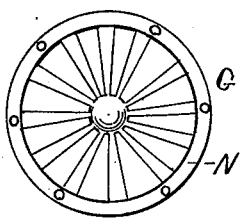
Figure 4:
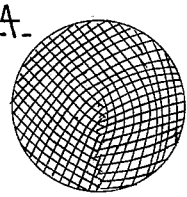

Figure 1 is a vertical sectional elevation of a water-filter embodying my improvements, taken on line $x$, Fig. 2; Fig. 2, an inverted or bottom view thereof. Fig. 3 is a plan or top view of one of the conical end supports; Fig. 4, a plan or top view of the conical gauze-wire which covers the cones.

The present invention relates to a device for filtering water under hydrant or other pressure and cleaning the filter with filtered water.

The nature of the invention consists in two headed cylinders provided at their inner ends with grated conical supports to resist the pressure of water and prevent the conical gauze-wire covering the cones from being torn by the pressure of water, and to give an increased filtering-surface.

A branch pipe connects the cylinders at the top for the discharge of filtered water, and a branch supply-pipe connects at the bottoms of the cylinders, and a branch pipe at the bottom discharges the sediment when the current is reversed to clean the filters. The whole is hereinafter described.

A A′ represent cylinders, which are to be strong enough to stand the pressure, and which are provided with heads E F, secured in the ordinary manner by bolts R.

Grated cones G, of cast metal, are cast with flanges N and bolted fast to the bottoms F, and smaller grated cones S S of the same form are bolted to the heads E. The contours of these cones are covered with gauze-wire cloth of about No. 40.

Before the heads E are attached the cylinders are partly filled up with clean sand or finely-crushed rock, and then hair-felt or asbestus L, of about one inch in thickness, closely fitting the inside of the cylinders, is placed thereon as a finer filtering substance, and then the space above the felt or asbestus is filled with sand, and the upper head, with the cone and gauze thereon, is placed in the position shown.

The branch pipe B C communicates with the top heads of the cylinders, and branch pipes H J and I K communicate with the bottoms of the cylinders, the pipe H J being the supply-pipe and the pipe I K the waste-pipe.

The pipe I K (shown by dotted lines, Fig. 1) is placed lower down than pipe H J, for the convenience of operating the stop-cocks.

The operation is as follows: To clean the filter shut cock D, cocks $a$ and $d′$, and open cocks $a′$ and $d$, and this will cause the filtered water passing up through cylinder A′ to pass down through cylinder A and drive the sediment out of said cylinder through the open cock $d$. To clean cylinder A′ close cock $a′$ and $d$ and open cocks $a$ and $d′$.

I claim and desire to secure by Letters Patent—

The combination of the cylinders A A′, cones S S G G, conical gauze-wire T, branch pipe B C above the cylinders, and branch supply-pipes H J and branch waste-pipe I K below the cylinders, and hair-felt or asbestus L placed between the columns of sand or crushed rock in cylinders for filtering water and removing sediment from the filter with filtered water, as specified.

JACKSON WILLSEY.

Witnesses:
 G. L. CHAPIN,
 A. G. MOREY.